United States Patent [19]

Alvarez, Jr. et al.

[11] Patent Number: 5,910,292
[45] Date of Patent: Jun. 8, 1999

[54] METHOD FOR WATER REMOVAL FROM CORROSIVE GAS STREAMS

[75] Inventors: Daniel Alvarez, Jr., San Diego; Jeffrey J. Spiegelman, La Jolla, both of Calif.

[73] Assignee: Aeronex, Inc., San Diego, Calif.

[21] Appl. No.: 08/914,524

[22] Filed: Aug. 19, 1997

[51] Int. Cl.$^6$ .................................................. B01D 53/28
[52] U.S. Cl. ........................... 423/210; 423/488; 95/117; 95/902
[58] Field of Search ..................... 423/488, 210, 423/481, 483, 500, 292, 341, 466; 95/117, 902

[56] References Cited

U.S. PATENT DOCUMENTS

| | | | |
|---|---|---|---|
| 3,078,635 | 2/1963 | Milton | 95/902 |
| 4,402,714 | 9/1983 | Fethke et al. | 423/212 |
| 4,713,224 | 12/1987 | Tamhankar et al. | 423/219 |
| 4,853,148 | 8/1989 | Tom et al. | 252/194 |
| 4,925,646 | 5/1990 | Tom et al. | 423/488 |
| 4,933,162 | 6/1990 | Vansant et al. | 423/488 |
| 5,032,152 | 7/1991 | Vansant et al. | 95/902 |
| 5,051,117 | 9/1991 | Prigge et al. | 95/902 |
| 5,139,782 | 8/1992 | Jung | 424/401 |
| 5,286,369 | 2/1994 | Roberie et al. | 208/114 |
| 5,539,998 | 7/1996 | Mostowy et al. | 34/343 |

OTHER PUBLICATIONS

Dana, "A Textbook of Mineralogy", pp. 640–675 (4$^{th}$ Ed. [Rev'd. by Ford]: 1932). (no month).

Deer et al., "An Introduction to the Rock Forming Minerals", pp. 393–402 (1966) (no month).

Fine et al., "The Role of Moisture in the Corrosion of Hbr Gas Distribution Systems", in *J. Electrochem. Soc.*, vol. 142, No. 4, pp. 1286–1292 (1995).

Kuhl et al., "Molecular Sieves", in Ruthven, Ed., *Encyclopedia of Separation Technology*, vol. 2, pp. 1339–1369 (1997) (no month).

Whitlock et al., "High Purity Gases", in Ruthven, Ed., *Separation Technology*, vol. 1, pp. 987–1000 (1997) (no month).

*Primary Examiner*—Ngoc-Yen Nguyen
*Attorney, Agent, or Firm*—Brown, Martin, Haller & McClain, LLP

[57] ABSTRACT

A process and apparatus for the removal of water from corrosive halogen gases, particularly chlorine- or bromine-containing gases, down to $\leq 100$ ppb water concentration are described. The critical component is a high silica zeolite, preferably high silica mordenite, which in a variety of physical forms is capable of dehydrating such gases to $\leq 100$ ppb or $\leq 50$ ppb without being detrimentally affected by the corrosive nature of the gases in the presence of water. The high silica zeolite is produced by the removal of alumina from a natural or synthetic zeolite while retaining the desirable zeolite structure, to a silica:alumina ratio of from 20–2000:1. Metal cations which may be depleted by the alumina removal may be replaced by solution impregnation. Halogen- or halide-containing gases, or those with equivalent corrosion properties, may be dehydrated without deterioration of the high silica zeolite. The high silica zeolite is retained in a corrosion-resistant container which is installed in a gas supply line, such as to a gas- or vapor-deposition manufacturing unit. The invention provides final dehydration to corrosive halogen gas streams intended for gas- or vapor-deposition formation of high purity electronic, optical, prosthetic or similar products, and can be used in combination with upstream preliminary dehydration process and/or solid particulate removal units.

20 Claims, 1 Drawing Sheet

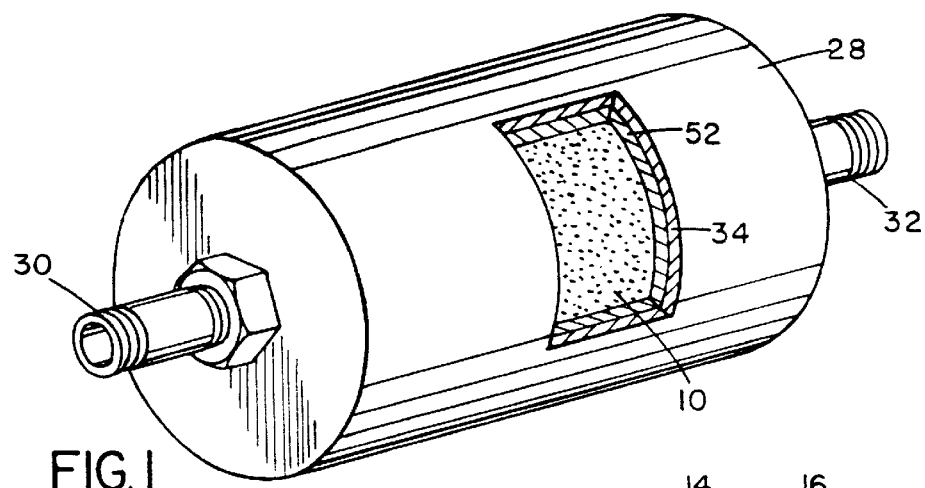
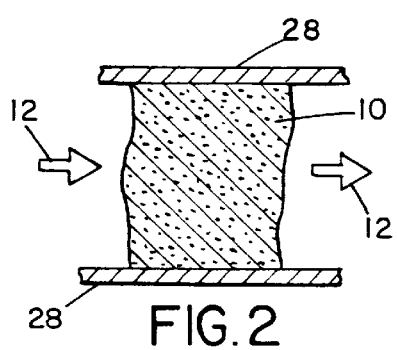
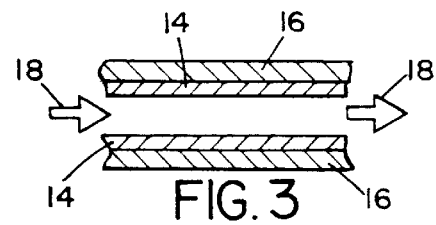
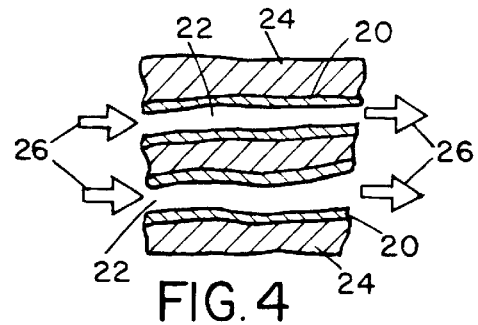
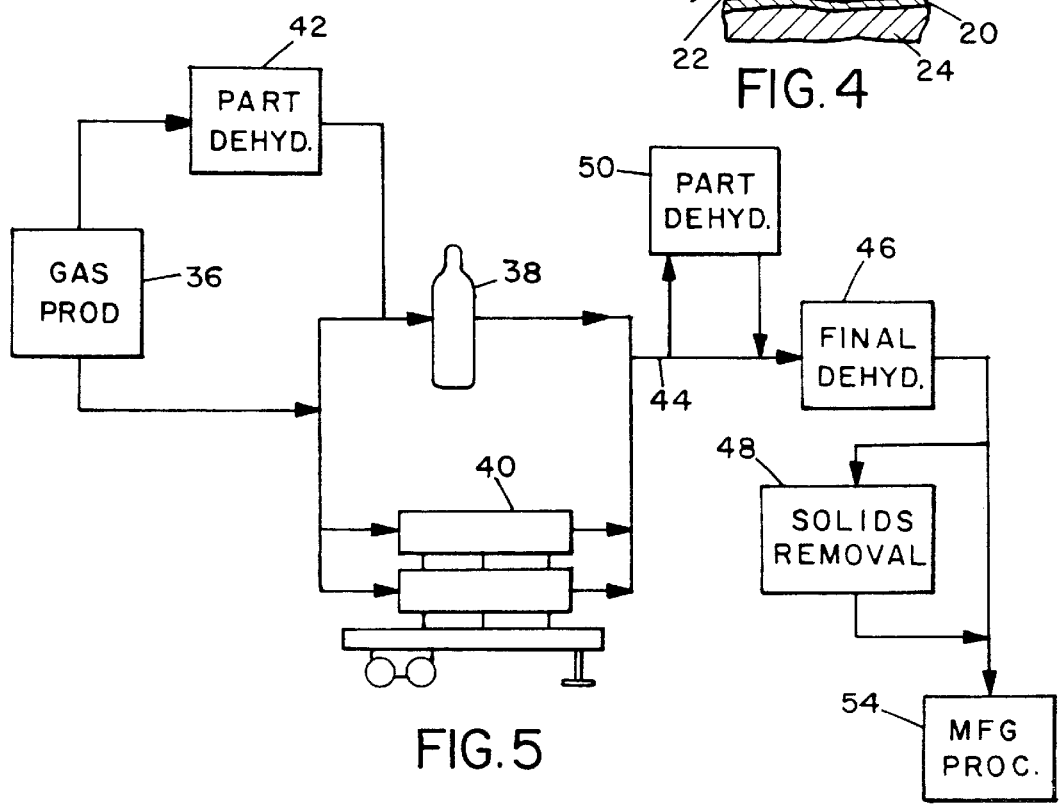

METHOD FOR WATER REMOVAL FROM CORROSIVE GAS STREAMS

BACKGROUND OF THE INVENTION

1. Field of the Invention

The invention herein relates to the removal of water from corrosive gas streams. More particularly it relates to the production of substantially water-free gas streams for use in the production of semiconductors and similar products which cannot tolerate the presence of water during manufacture.

2. Description of the Prior Art

There are many products which are made by depositing elemental materials and compounds from gases or vapors containing those materials. Such gas- or vapor-deposition process are commonly used to form high purity products, such as coating and etching silicon wafers for semiconductors or other electronic substrates, semiconductor layer circuitry, or prosthetic products for human and animal usage. In order for the products to be of high purity, the gases fed to the deposition chamber must be themselves of high purity. This requirement has become increasingly important as the products, especially semiconductors and integrated circuits, have become more complex, with higher component densities, more and thinner layers and submicron conductor widths and spacings. The presence in the gases of particulates or, most importantly, water, can substantially reduce the yield of useful products from the manufacturing process, and can also cause substantial damage to the manufacturing equipment.

Water is one of the most common and yet most difficult impurities to remove from the gases. Water is of course ubiquitous in almost all ambient environments. Even systems which are nominally referred to as "dry" usually have significant amounts of water, and most drying processes can reduce the moisture content of a gas only to a "minimum" which is still in the parts per million (ppm) range. However, since for many purposes water contents in the ppm range are quite acceptable, there are numerous patents and articles in the literature dealing with such types of "ppm drying processes."

In the manufacture of many electronic products or high purity wafers, chips, or ceramics, however, moisture contents of the depositing gases which are in the ppm range are excessively wet. To form satisfactory products, the water content of the depositing gases must be reduced to the parts per billion (ppb) range, usually down to no more than about 100 ppb. See Whitlock et al, "High Purity Gases," in Ruthven, ed., ENCYCLOPEDIA OF SEPARATION TECHNOLOGY, vol. 1, pp. 987–1000 (1997).

Further, there are a number of gases used in the manufacture of high purity products which are readily handled when dry, but which in the presence of water become highly corrosive to manufacturing system equipment. Corrosion in turn causes gas leaks and component failures in valves, regulators, filters, flow controllers, tubing and fittings. Among the most common gases which are aggressive and corrosive when they have a high moisture content are the halogen gases, such as the hydrogen halides and the gaseous halides. The halogen gases have been found to be excellent silicon etchants, and therefore it is important to insure that they can be used effectively in the production of the high purity products.

The corrosive effect of the halogen gases in the presence of water not only causes damage to the equipment, it also is detrimental to the products. The water content itself causes problems in product integrity and yield. In addition, the gas-induced corrosion of the equipment, tubing, etc., generates small particles of corroded metals. These become entrained in the gas stream and are carried into the product formation chambers, where they deposit onto products being formed, thus ruining the products and requiring their rejection.

There are prior art processes which can remove water from gas streams down to the $\leq 100$ ppb range. However, these are effective only for gases which do not react with the dehydrating material. Such gases include the conventional "inert" gases as well as other gases and vapors which are unreactive with (i.e., "inert to") the dehydrating material. Such processes, however, do not work satisfactorily when the gases are corrosive in the presence of moisture, since as noted above such gases attack the dehydrating material and quickly render it useless. These processes are therefore not useful to dehydrate the halogen-containing gases and gases of similar corrosivity.

Attempts to use silica, alumina, titanium tetrachloride, and other oxides, halides, etc. to remove moisture from halogen-containing gases have not been successful. While corrosive halogen-containing gas streams can be dehydrated for short periods of time down to the 10 ppb level, the corrosive effects of the halogen gases very quickly damage and deactivate the active dehydration materials requiring frequent removal and replacement of the dehydration materials in order to insure a feed stream of dried halogen-containing gases in the manufacturing systems.

Active metals have also been used as "getters" to remove oxygen from streams of other gases, notably argon, and there is substantial prior art regarding various gettering processes and metals. In particular, metals such as titanium and zirconium have frequently been used as getters; see for instance, U.S. Pat. Nos. 4,629,611 and 5,556,603. In such processes the oxygen is removed by reacting it with the metal to form a solid oxide which can be separated from the gas stream. Wet argon, however, is not a corrosive gas in the manner of the halogen gases.

Zeolites have been used in moisture removal processes before, but not as active dehydration agents. Rather they have been present merely as carriers or substrates for various impregnated metal getters or dehydrating catalysts, as described above. In this regard they have merely been substitutes for conventional silica, alumina and carbon substrates. Typical examples of such systems will be found in U.S. Pat. Nos. 4,853,148 and 4,925,646 (both to Tom et al.).

Consequently, the problem of removal of moisture down to $\leq 100$ ppb from corrosive halogen-containing gases remains a significant problem in the field of production of high purity semiconductors, substrates, prosthetics, ceramics and the like. Those processes which are being used are expensive because of the very short service life of the dehydrating materials and the need for their frequent replacement. In addition, since it is difficult to determine the exact rate of deterioration of the dehydrating materials in the presence of the corrosive halogens and halides, user of such dehydrating materials must schedule their discard and replacement at intervals less than the shortest expected service life. To do otherwise would risk failure of a dehydrating unit with the resultant loss of contaminated product when the excessive moisture reaches the production chamber through the failed unit. Consequently, the current systems require that many if not most of the dehydrating units must be discarded while they still have some degree of useful service life left, thus further increasing the expense of the system operations.

In most high-purity product manufacturing processes, it has been conventional for halogen gases to be stored in and supplied from standard gas cylinders. The volume of gas in each such cylinder is of course limited, so that in larger scale manufacturing processes, it becomes necessary for process operators frequently to replace emptied cylinders and replace them with fresh, full cylinders. This frequent handling and movement of heavy, awkward gas cylinders represents a safety hazard to the operators, as well as providing opportunities for gas leakage and increasing the cost of manufacturing. Also importantly, each time an empty gas cylinder is detached from the system and a new full cylinder attached, there is an opportunity for ambient moisture to enter the system, thus increasing the dehydration load on the system and accelerating the system corrosion. The industry is beginning to require gases to be supplied in large volume containers which need to be changed only at infrequent intervals (usually measured in months rather than hours, as with the individual gas cylinders). A preferred type of large volume container is the "tube trailer," a semi-trailer which is constructed with a number of "tubes," high capacity extended high pressure vessels, which are interconnected or operate through a common manifold. A tube trailer can be parked at a manufacturing facility and attached to the gas supply system, and will typically have sufficient gas capacity to supply the halogen gas to the facility for a period of months. This eliminates the need for frequent handling and changes of conventional gas cylinders and reduces dramatically the number of times that the system needs to be opened for cylinder changes and thus exposed to ambient moisture infiltration. Equally importantly, since the tube trailer is usually parked outside the manufacturing building, it also positions the gas supply outside, so that any gas leakage does not endanger the operators and access to the leaking vessels for repair or containment is greatly simplified.

SUMMARY OF THE INVENTION

We have now developed a unique and highly effective process for the removal of water from corrosive halogen gases down to $\leq 100$ ppb concentration. This dehydration process can be operated for long periods of time in the presence of these gases, since the critical material used is not susceptible to halogen corrosion. The invention also includes the unique compositions and their various configurations as used in this process, as well as apparatus for containing the compositions, and which is adapted to be mounted in a gas conduit delivering the gas or vapor to a gas- or vapor deposition chamber.

In particular, we have discovered that high silica zeolites, particularly high silica mordenite and its analogs, can be used very effectively to reduce water content of halogen gases to 100 ppb or lower, and in many cases down to at least 50 ppb. The high silica zeolites are preferable used as a porous bulk material, but can be in the form of coating or other forms contained in a simple housing which is easily installed in the gas supply line to the gas- or vapor-deposition manufacturing equipment. The container itself is made of a halogen-resistant metal or with a halogen-resistant lining, so that the housing itself is not susceptible to corrosion and thus does not become the limiting factor in the service life of the system.

For purposes of this invention, "halogen gases" may be defined as those gases in which the predominant component is a gaseous halogen, a gaseous hydrogen halide, a comparable gaseous compound containing an active halide moiety, or a gas having equivalent corrosion properties in the presence of water. Principal examples include HCl, HBr, HF, $F_2$, $Cl_2$, $Br_2$, $BCl_3$, $SiCl_4$ and $ClF_3$. The iodine-containing gases are also included within this invention, but in practice they are rarely used in manufacturing. It will also be understood that a process gas stream may contain a single halogen gas or mixtures of halogen gases, or may contain one or more halogen gases mixed with other, non-corrosive gases. Of course in any gas mixture the gases must be compatible with and inert toward each other, except as may be required by the particular manufacturing process involved.

The zeolites are a class of synthetic and natural minerals having an aluminosilicate tetrahedral framework, ion-exchangable large cations, and 10%–20% loosely held water molecules which permit reversible dehydration without significant alteration in the molecular structure. They are often referred to as "molecular sieves" because of their ability to separate gaseous and liquid molecules on the basis of molecular size. The metal cations present are primarily sodium and calcium, but may also include various alkali metal or alkaline elements such as potassium, strontium and barium. To be suitable for the present invention, the zeolites must have the water removed and also the alumina content must be reduce to a point where the silica is the predominant component of the zeolite structure. Particularly preferred in this invention is a high silica mordenite.

In the preferred high silica zeolite structure of the present invention, the $SiO_2:Al_2O_3$ ratio will be at least 20:1, preferably will be at least 50:1, and more preferably will be at least 90:1 or higher. It is believed that the critical aspect which determines suitability of a particular zeolite for the present invention is the ability to undergo alumina removal without significant alteration in the zeolite structure or metal cation content. For instance, with the preferred material, silica mordenite, the mordenite structure (whether natural or synthetic) is considered to be quite suitable for dehydration of a gas stream, both because it is a good water adsorbent and also because of its structural stability in the flowing gas stream. However, the alumina component is susceptible to reaction with the halogens or halides in the gas streams of interest herein. Consequently, by removal of the alumina but retention of the mordenite structure and cation content, the resulting silica mordenite becomes a corrosion-resistant dehydration agent eminently suitable for use in dehydration of halogen gas streams.

Therefore, in one broad embodiment, the invention is of a method of removing water from a stream of corrosive halogen gas which comprises passing said gas stream over or through a quantity of high silica zeolite for a period of time sufficient to reduce the water content of said gas stream to not more than 100 ppb, said high silica zeolite being substantially unaffected by said corrosive gas. The zeolite is preferably in the form of a porous solid body and the stream of corrosive gas flows through the porous body; in the form of a plurality of granular or powdered particles thereof, and the stream of corrosive gas flows through the plurality of granular particles; present in the form of a coating on the surface of a high surface area solid substrate, and dehydration of the gas stream occurs as the gas stream is passed over the zeolite coating for a period of time sufficient to reduce the water content of the gas stream to not more than 100 ppb.; or deposited within the pores of a porous solid substrate, and dehydration of the gas stream occurs as the gas stream is passed through the pores and contacts the deposited zeolite coating for a period of time sufficient to reduce the water content of the gas stream to not more than 100 ppb.

In yet another broad embodiment, the invention is of a composition for the removal of water from a stream of corrosive gas which comprises a quantity of zeolite which is disposed is a corrosive gas stream either as a porous solid or deposited on a solid substrate, such that the gas flowing over or through the zeolite or substrate contacts the zeolite and is thereby dehydrated to a water content of not more than 100 ppb without causing degradation or structural change of the zeolite.

In another broad embodiment, the invention is of apparatus for removing water from a stream of corrosive halogen gas comprising a container comprising a gas-tight chamber therein, a gas inlet port and a gas outlet port penetrating said container and respectively providing fluid communication for flow of said gas into said chamber from the exterior of said container and out of said chamber to the exterior of said container, and retained within said chamber a high silica zeolite in a quantity sufficient to reduce water content of said stream of corrosive gas to not more than 100 ppb as said gas passes through said chamber and therein contacts said high silica zeolite. The zeolite may be disposed within the chamber as a solid porous body or a body of granules or powder or may be retained within the container by placement on a solid substrate in the gas flow path between the inlet port and the outlet port, and positioned such that the gas flowing through the chamber will pass over or though the zeolite. Alternatively there may be a high surface area substrate with the zeolite in the form of a coating on the surface of the high surface area solid substrate, or there may be a porous solid substrate with the zeolite is deposited within the pores of the porous solid substrate, in each case such that dehydration of the gas stream occurs as the gas stream is passed through the pores and contacts the deposited zeolite coating for a period of time sufficient to reduce the water content of the gas stream to not more than 100 ppb.

The preferred form of zeolite for this invention will be a high silica mordenite or its analogs.

The systems of this invention will be used to provide final dehydration to halogen gas streams intended for gas- or vapor-deposition formation by coating, etching, etc. of high purity electronic, optical, prosthetic or similar products. Commonly one may use a preliminary dehydration process upstream of a system of this invention, to reduce the water content of the gas stream to a level generally not lower than about 1 ppm, to maximize the efficiency and service life of the system of this invention. A solid particulate removal unit may also be placed upstream of the system of this invention, to remove particulate matter from the gas stream.

BRIEF DESCRIPTION OF THE DRAWINGS

FIG. 1 is an oblique view, partially cut away, of a canister for containment of the zeolite dehydration material for use in this invention.

FIG. 2 is a schematic sectional view illustrating a porous body of zeolite in which the halogen- and moisture-containing gases contact the zeolite and are dehydrated as they pass through the zeolite body.

FIG. 3 is a schematic sectional view illustrating coating of high silica zeolite on a high surface area substrate and use of the coated substrate in the process of this invention to dehydrate the halogen- and moisture-containing gases as they pass over and contact the zeolite coating.

FIG. 4 is a schematic sectional view illustrating a porous substrate which has coated on the interior walls of its pores the high silica zeolite, which contacts the halogen- and moisture-containing gases as they pass through the substrate and contact the zeolite coating.

FIG. 5 is a block diagram illustrating the use of the present invention in a gas dehydrating system for a gas- or vapor-deposition manufacturing process.

DETAILED DESCRIPTION AND PREFERRED EMBODIMENTS

The critical aspect of the present invention is the use of a corrosion resistant high silica zeolite as the dehydrating or drying agent for removal of water from corrosive gas streams, notably halogen-containing gas streams, down to the 100 ppb concentration level for extended periods of time without itself being corroded and deteriorated by the presence of the halogen. Our work leading to this invention examined a wide variety of metals, alloys, polymers, oxides and similar materials known to function as dehydrating agents in non-aggressive or non-corrosive systems. However, we found that none proved to be successful in maintaining active and effective water removal over beyond very modest service lives in the presence of the corrosive halogen-containing gases.

It will be recognized in considering this invention that "effectiveness" for the purpose of the invention means the ability to remove sufficient water from the gas stream that the residual water content of the treated gas after contact with the high silica zeolite in the dehydrating device is no more than 100 ppb, preferably no more than 50 ppb. While the prior art has often taught the use of oxides or metals for various "purification" or "dehydration" processes, invariably those systems have operated only because the gases in question were inert, non-corrosive or non-aggressive to all of the dehydrating materials. Such prior art did not, however, examine dehydration of gases which were aggressive and corrosive in the presence of water, and therefore did not suggest or identify the unique nature of the specific type of high silica zeolites which we have discovered and which is critical to the exceptional functioning of the present invention. Thus, with respect to the present invention, a material's mere ability to reduce water content to a desired level is not sufficient for usage; the material must also be sufficiently resistant to halogen corrosion that it can be used for extended service periods of at least 24 months of maintaining 100 ppb moisture content (or less, usually significantly less) in the exit gases. Our invention resides in the discovery that the high silica zeolites are unique in this respect.

As described above, we will refer to "halogen gases" herein as those gases in which the predominant component is a gaseous halogen, a gaseous hydrogen halide, or a comparable gaseous compound containing an active halide moiety, or mixtures thereof with each other and/or with non-corrosive compatible gases. Principal and preferred examples include HCl, HBr, HF, $F_2$, $Cl_2$, $Br_2$, $BCl_3$, $SiCl_4$ and $ClF_3$.

The zeolites are a well known and widely described class of natural and synthetic aluminosilicates. For the purposes of this invention, the term "zeolite" will mean any aluminosilicate, natural or synthetic, which has a crystalline structure substantially equivalent to that of the minerals classified as zeolites. The natural zeolites have been widely described in standard mineralogy texts for many years; particularly good descriptions are found in Dana, A TEXTBOOK OF MINERALOGY, pp. 640–675 (4th ed. [rev'd. by Ford]: 1932); Deer et al., AN INTRODUCTION TO THE ROCK FORMING MINERALS, pp. 393–402 (1966) and Kühl et al., "Molecular Sieves," in Ruthven, ed., ENCYCLOPEDIA OF SEPARATION TECHNOLOGY, vol. 2, pp. 1339–1369 (1997). The synthetic zeolites, which have been developed primarily for use in chemical and petroleum catalytic processes, are often referred to by the prefix word "synthetic" attached to the name of their natural counterparts, or, for those synthetic zeolites which do not have natural counterparts, but various coined names, such as Zeolite A, Zeolite X, Zeolite Y, ZSM-5, and so forth. An excellent description of the synthetic zeolites and their manufacture and uses as catalysts will be found in the Kühl et al. reference cited above.

Zeolites, both natural and synthetic, have the general formula and structure of $(M,M').mAl_2O_3.nSiO_2.xH_2O$ where M and M' are each usually sodium, potassium, calcium or barium, but may also be strontium, or, rarely, magnesium, iron or other metal cations. The less common cations are found more often in the synthetic zeolites, where they have usually been incorporated for specific catalytic purposes. The coefficients m, n and x will vary according to the specific zeolite considered. The grouping of zeolite "families" is usually based on associating structures having similar ratios of alumina:silica:water. For instance, mordenites normally have $Al_2O_3:SiO_2:H_2O$ ratios of approximately 1:9–10:6–7, heulandites of approximately 1:6–9:5–6 and phillipsites of approximately 1:2:2. Numerous others are illustrated in the above-mentioned references. In the present invention the most preferred structure is that of the mordenite family, more particularly of mordenite itself. This is variously described for the natural mineral as $(Ca,Na).Al_2O_3.9SiO_2.6H_2O$ by Dana, supra, and as $(Na_2,K_2,Ca)(Al_2Si_{10}O_{24}].7H_2O$ by Deer et al., supra. Analogous members of the mordenite family are ptilolite, flokite, ferriertitie and dachiardite among the natural zeolites and a synthetic zeolite known commercially as "Zeolon."

For the purposes of the present invention, however, the conventional natural and synthetic zeolites, including the mordenites, are not sufficiently resistant to halogen gas corrosion in the presence of water to be useful as dehydrating agents. However, we have discovered that if the alumina content of the zeolite is substantially reduced, producing a predominately silica zeolite, and the metal cation content is substantially retained, the resulting material, which we will refer to herein as a "high silica zeolite," has superior resistance to halogen gas corrosion in the presence of water. Because of this superior resistance and the retention of the zeolite structure, the resulting high silica zeolites are excellent dehydrating agents for corrosive halogen gases in the high purity product manufacturing processes. Of the high silica zeolites, the high silica mordenites are particularly preferred. While not wishing to be bound to any particular theory of dehydration mechanism, we believe that the mordenite structure retained in the high silica mordenites is particularly suited to adsorption of water from the gas stream. For brevity herein, the dehydration agent of the present invention will often be referred to as the exemplary high silica mordenite; it will be understood, however, that the descriptions are also applicable to all of the useful high silica zeolites, The high silica zeolites useful in this invention will have a silica:alumina ratio of at least 20:1, preferably at least 50:1, and more preferably at least 90:1. A preferred range is 90–500:1, although high silica zeolites with ratios as high as 2000:1 have been prepared and it is anticipated that the higher ratios will be preferred in specific applications. Normally the high silica zeolites are prepared by treating the original natural or synthetic zeolite with a reactant specific to alumina, so that the alumina content is substantially reduced without affecting the silica content or significantly altering the zeolite structure. While not wishing to be bound to any particular theory of the mechanism of corrosion resistance, we believe one reason for the superior resistance to halogen gas corrosion in the presence of water of the high silica zeolites is the relative rates of formation of aluminum halides versus silicon halides in the halogen gas environment.

It has been found important to substantially retain the metal cation content to maintain the zeolite structure and not merely convert the zeolite to a silica structure. Since the metal cations often have an affinity for the alumina content of the zeolite, removal of the alumina can also remove a substantial portion of the metal cations. If the amount of the metal cation content removed with the alumina is such as to have an adverse effect on the zeolite activity, some or all of that metal cation content must be replaced. This can conveniently be done by impregnating the reduced alumina content zeolite with metal cations from a solution of corresponding metal halide.

For most of the high silica zeolites, including the preferred high silica mordenite, it is preferred to activate the material prior to incorporation into the gas system for dehydration. Activation can be accomplished by heating the high silica zeolite in an anhydrous inert gas atmosphere (e.g., $N_2$ or Ar gas) at a temperature of about 250°–425° C. (480°–800° F.) for about 48–72 hours. The activating gas itself must be dehydrated prior to the activation procedure.

The high silica zeolites can be used in a variety of different embodiments. As illustrated in FIG. 2, one can simply pass the gas through a body 10 consisting substantially or essentially of the high silica mordenite, either in a block form or as a body of granules, in order to take advantage of the porous zeolite structure (a particularly preferred embodiment of the high silica zeolite has a pore size in the range of 3–8 Å), as indicated by the arrows 12. The high silica mordenite body can also be in the form of a body of comminuted fine powders. However, using such powders will cause a significant pressure drop in the gas stream, so it is preferred to used a powdered form of the zeolite only in high gas pressure systems. It is thus possible to have different forms of the high silica zeolite materials for gas streams of different pressures, by using different particle sizes.

Alternatively, as shown in FIG. 3, the high silica mordenite can be in the form of one or more sheets 14, alone or coated on a substrate 16, over and/or between which the gas (indicated by the arrows 18) is flowed. Typically the inlet gases for dehydration will have water contents in the range of about 1–2 ppm, and the outlet, dried gases will have water contents no greater than about 100 ppb, and preferably no greater than 50 ppb. Further, as illustrated in FIG. 4, the high silica mordenite can also be used as a thin coating 20 in the pores 22 of a porous ceramic or other inert solid 24 over which flows the gas to be dehydrated, as indicated by the arrows 26.

In the present invention it is most convenient to have the high silica mordenite (however configured) to be used in dehydration 46 to be contained within a corrosion-resistant housing or canister 28, such as shown in FIG. 1. The canister 28 has a gas inlet port 30 and a gas outlet port 32, with the zeolite 10 retained within the canister 28 in one of the forms described above, as illustrated in the cut-away section of canister wall 34. Typically, for flow lines for various common gas streams to be dehydrated, one will be dealing with gas flow rates in the range of about 1–4000 standard liters of gas per minute (slm) and desired lifetimes in the range of 12–24 months or more. Operating temperatures of the gases may range from 0°–65° C. (32°–150° F.) and maximum inlet pressures to the canister 28 are commonly in the range of about 15–3600 psig ($10^3$–$2.5 \times 10^6$ kPa). While any convenient container may be used, preferred are cylindrical canisters 28 with diameters in the range of about 1–30 in. (2½–75 cm) and lengths of 3–48 in. (10–120 cm). The canister size will be dependent upon the gas flow space velocity, the activity of the high silica mordenite, and the amount of water to be removed, since it is necessary to have sufficient residence time in the canister 28 to reduce the water content of the gas to or below 100 ppb.

It is often advantageous, as shown in FIG. 5, to position a conventional "ppm" dehydration unit 32 (commonly a distillation unit) upstream of the dehydration process 46 of the present invention to provide preliminary reduction of the water content of the gas down to a level in the ppm range, preferably and if possible down to a level of 0.5–1 ppm. This of course will reduce the required residence time for the gas in dehydration 46 and also allow significant extension of the service life of the canister 28 and high silica zeolite because of the reduced quantities of water which will need to be removed from the gas to get the final water content in the exit gas down to the 100 ppb, or preferred 50 ppb, level or less before it passes to the product manufacturing process 54.

Also as illustrated in FIG. 5, it will be advantageous to use the process, material and equipment of the present invention in gas production facilities here the original high purity gases are produced for shipment to the ultimate product manufacturers. Commonly, halogen-containing gases in bulk are produced by the gas supply companies as at 36 and commonly then loaded into and shipped in familiar steel pressure cylinders 38 or tube trailers 40. This system can be modified by passing the produced gases through a system 42 of the present invention, but which is designed for only partial dehydration, before they are loaded into the cylinders 38 or tube trailers 40 for shipment to the customers. It will be understood that the volume of gas being transferred to the cylinders or trailers by the manufacturer is usually such that it is usually not economically justified to try to reduce the water content down to the final 100 ppb for delivery to the gas manufacturer's facility. Normally some water is likely to reenter the gas while being connected to the customer's gas supply system. Also, dehydration to the final level for such a large volume of gas will take longer than is justified when filling large numbers of cylinders 38 or trailers 40. However, the value of usage of the system of this invention is that the cylinders 38 or tube trailers 40 of gas then arrive at the ultimate manufacturers' facilities with a greatly reduced water content, such that they can be attached to the gas feed line 44 and pass through the dehydration unit 46 of the present invention for the final reduction to the water content needed for the production process 54, without requiring an intermediate water reduction step 50. (Such a step may be advantageously used, however, if the gas in cylinders 38 or trailers 40 has not had a prior partial drying in unit 42. Partial dehydration 50 may thus be an alternative to partial dehydration 42, to reduce the amount of water which must be removed in the final dehydration unit 46.)

It is also advantageous in most gas delivery systems to include a solids removal unit 48 either upstream, or preferably downstream of dehydration unit 46, to eliminate any particulate matter which has entered from a cylinder 38 or tube trailer 40 (or some other source). Such solids removal units are conventional, and will be of a type made of halogen-corrosion-resistant materials.

The containers or canisters 28 for the high purity mordenite which make up the devices of the present invention will be made of electropolished 316 stainless steel or other metal which is resistant to halogen gas corrosion, or they can be coated on the inside with a corrosion-resistant coating 52, as illustrated in FIG. 1. In most cases these coatings will simply be inert materials which are resistant to halogen corrosion, but which do not contribute significantly to dehydration of the gas. However, It may be desirable to make the coating 44 on the inside of the container 28 from the high silica mordenite, so that one can obtain dehydration along the walls of the container 28 in addition to the dehydration occurring at the high silica mordenite bodies, coated substrates, coating porous bodies, etc. within the container itself.

As the service time of a system of the present invention continues, the high silica mordenite becomes slowly deactivated. We have found that the high silica mordenite can be successfully reactivated by heating it (outside or within the canister 28) at a temperature of about 250°–425° C. (480°–800° F.) for 48–72 hours in a nitrogen purge. This effectively removes any adsorbed water. Caution should be taken, however, in the event that there is any residual adsorbed hydrogen halide from the halogen gases. It is also advisable to conduct such a heated nitrogen purge drying when the unit 28 is initially put into service, to remove any residual moisture which may have entered the system while the device was being installed or previously during manufacturing or shipment.

It will be recognized that while the invention has been characterized in terms of use with gases for semiconductor and other electronic substrate manufacturing, it will be of similar value with respect to treatment of any corrosive halogen-containing gases that are used for deposition of component materials for any other type of high purity product where moisture content is detrimental to the product's production. This could include, for instance, production of certain prosthetic devices for implant in humans or animals, production of high purity substrates or other types of materials for research purposes, production of optical fibers and optoelectronic devices (including lasers) and production of high purity materials that are to be used in extreme environments such as products for use in spacecraft or artificial satellites.

It will be evident from the above that there are numerous embodiments of this invention which, while not expressly stated above, are clearly within the scope and spirit of the invention The above description is therefore intended to be exemplary only, and the actual scope of the invention is to be defined solely by the appended claims.

We claim:

1. A method of removing water from a stream of corrosive halogen gas which comprises contacting said gas stream with a quantity of high silica zeolite for a period of time sufficient to reduce the water content of said gas stream to not more than 100 ppb, said high silica zeolite comprising a zeolitic structure and a silica:alumina ratio of at least 20:1 and being substantially unaffected by said corrosive gas.

2. A method as in claim 1 wherein said water content of said gas stream is reduced to not more than 50 ppb.

3. A method as in claim 1 wherein said high silica zeolite comprises a zeolitic structure and a silica:alumina ratio of at least 50:1.

4. A method as in claim 3 wherein said high silica zeolite comprises a zeolitic structure and a silica:alumina ratio of at least 90:1.

5. A method as in claim 1 wherein said high silica zeolite comprises a high silica mordenite.

6. A method as in claim 1 wherein said high silica zeolite is formed by reducing the alumina content of a natural or synthetic zeolite.

7. A method as in claim 6 wherein reduction of said alumina content also reduces the content of metal cations in said natural or synthetic zeolite, and said method further comprises impregnating said high silica zeolite with a solution of metal cations in an amount sufficient to substantially reproduce the original metal cation content.

8. A method as in claim 1 wherein said high silica zeolite comprises a unitary object or comprises a body of granules or powder and said gas passes over or through said object or body.

9. A method as in claim 8 wherein said high silica zeolite comprises a powder and the pressure of said gas is sufficient that the pressure drop occurring as said gas passes through said powder does not materially affect the subsequent flow of the gas.

10. A method as in claim 1 wherein said high silica zeolite is coated on the surface of a substrate.

11. A method as in claim 1 wherein said high silica zeolite is deposited within the pores of a porous solid substrate, and dehydration of said gas stream occurs as said gas stream is passed through said pores and contacts said deposited high silica zeolite coating.

12. A method as in claim 1 wherein said corrosive halogen gas comprises a molecular halogen gas, a hydrogen halide gas, a gas containing an active halogen moiety, or a gas having equivalent corrosion properties in the presence of water.

13. A method as in claim 12 wherein said corrosive halogen gas comprises a molecular chlorine gas, a hydrogen chloride gas, a gas containing an active chlorine moiety, or a gas having equivalent corrosion properties in the presence of water.

14. A method as in claim 12 wherein said corrosive halogen gas comprises a molecular bromine gas, a hydrogen bromide gas, a gas containing an active bromine moiety, or a gas having equivalent corrosion properties in the presence of water.

15. A method as in claim 12 wherein said corrosive halogen gas comprises a molecular fluorine gas, a hydrogen fluoride gas, a gas containing an active fluorine moiety, or a gas having equivalent corrosion properties in the presence of water.

16. A method as in claim 12 wherein said corrosive halogen gas comprises a molecular iodine gas, a hydrogen iodide gas, a gas containing an active iodine moiety, or a gas having equivalent corrosion properties in the presence of water.

17. A method as in claim 12 wherein said corrosive halogen gas is selected from the group consisting of HCl, HBr, HF, $F_2$, $Cl_2$, $Br_2$, $BCl_3$, $SiCl_4$ and $ClF_3$.

18. A method as in claim 1 wherein dehydration is preceded by or followed by a step of removal a solid particulate matter from said gas.

19. A method as in claim 1 wherein said high silica zeolite is activated prior to contact with said corrosive gas.

20. A method as in claim 19 wherein said activation comprises heating said high silica zeolite to a temperature on the order of about 250°–425° C. for a period for about 48–72 hours.

* * * * *